US011901750B2

(12) United States Patent
Lee et al.

(10) Patent No.: US 11,901,750 B2
(45) Date of Patent: Feb. 13, 2024

(54) MULTI-FUNCTIONAL CURRENT LIMITER FOR ENERGY STORAGE DEVICES

(71) Applicant: Hamilton Sundstrand Corporation, Charlotte, NC (US)

(72) Inventors: Yongduk Lee, Vernon, CT (US); Xin Wu, Glastonbury, CT (US); Bo Liu, Vernon, CT (US); Parag M. Kshirsagar, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 129 days.

(21) Appl. No.: 17/342,221

(22) Filed: Jun. 8, 2021

(65) Prior Publication Data
US 2022/0393489 A1    Dec. 8, 2022

(51) Int. Cl.
*H02J 7/00*     (2006.01)
*B64D 41/00*    (2006.01)

(52) U.S. Cl.
CPC ............ *H02J 7/0029* (2013.01); *B64D 41/00* (2013.01); *H02J 7/0013* (2013.01); *B64D 2221/00* (2013.01)

(58) Field of Classification Search
CPC .................................................... H02J 7/0029
See application file for complete search history.

(56) References Cited

U.S. PATENT DOCUMENTS

| 8,536,730 | B2 | 9/2013 | Rozman et al. | |
| 8,625,243 | B2 | 1/2014 | Rozman et al. | |
| 2012/0274142 | A1* | 11/2012 | Tinglow | H02J 7/0014 |
| | | | | 307/77 |

(Continued)

FOREIGN PATENT DOCUMENTS

| CN | 107769281 | * | 3/2018 |
| CN | 108599282 A | * | 9/2018 |

(Continued)

OTHER PUBLICATIONS

Huo, CN107769281 Translation (Year: 2018).*

(Continued)

*Primary Examiner* — Drew A Dunn
*Assistant Examiner* — Tynese V McDaniel
(74) *Attorney, Agent, or Firm* — CANTOR COLBURN LLP

(57) ABSTRACT

Systems for a current limiting circuit are provided. Aspects include a first set of batteries coupled to a battery terminal, a power converter coupled to a power converter terminal, wherein the battery terminal is coupled to the power converter terminal, a first current limiting circuit in series with the first set of batteries, wherein the current limiting circuit comprises a first circuit comprising a first transistor in series with a first diode, a second circuit comprising a second transistor in series with a second diode, a first RL circuit, wherein the first RL circuit, the first circuit, and the second circuit are arranged in parallel, a controller configured to operate the first current limiter in a plurality of modes including a battery discharge mode including the controller operating the first transistor in an off state, and operating the second transistor in a switching state.

21 Claims, 13 Drawing Sheets

(56) References Cited

U.S. PATENT DOCUMENTS

2013/0181681 A1* 7/2013 Mukai ................. H01M 10/425
                                                        320/128
2018/0301983 A1* 10/2018 Okazaki ................. B60L 53/11
2020/0119548 A1   4/2020 Haugan

FOREIGN PATENT DOCUMENTS

| CN | 108599282 A  |   | 9/2018  |              |
|----|--------------|---|---------|--------------|
| CN | 111864852 A  | * | 10/2020 |              |
| CN | 112886550 A  | * | 6/2021  | ...... H02H 3/066 |
| EP | 3696977 A1   |   | 8/2020  |              |
| KR | 20190116474 A |  | 10/2019 |              |

OTHER PUBLICATIONS

Chen, CN112886550 Translation (Year: 2021).*
CN108599282 Translation, Gao, One for Lithium Ion Power Battery Pack Charging and Discharging (Year: 2018).*
CN-111864852, Wang, Photovoltaic Power Generation System Lithium Battery Charging and Discharging (Year: 2020).*
European Search Report for Application No. 22172315.8, dated Oct. 14, 2022, 29 pages.
Machine Translation for: CN108599282 (A), Published: Sep. 28, 2018, 13 pages.

* cited by examiner

MULTI-FUNCTIONAL CURRENT LIMITER FOR ENERGY STORAGE DEVICES

BACKGROUND

The present invention generally relates to energy storage devices, and more specifically, to a multi-functional current limiter for energy storage devices.

Many fields of technology require the provision of drive power, from one or more power sources, to one or more loads. Often power has to be converted before being provided to the load(s) and/or has to be distributed between loads. Power distribution systems are used, for example, in aircraft and other vehicles to distribute electrical power from the power source(s), such as a generator (on the engine) or a battery, to different electronic systems having, often, different power requirements. A known problem is that when a load is switched on, particularly in the case of high capacitive loads, a current surge, or inrush current, can result which can cause damage to components and failure of the system. In aircraft applications, for example, inrush current should be limited to reduce the risk of a bus voltage drop, which could cause system fault when such loads are connected to a battery, HVDC (high voltage direct current) bus or LVDC (low voltage direct current) bus. It also needs to be limited to avoid electromagnetic interference issues due to high level of emissions and finally to reduce the risk of cable degradation. In non-private electrical buses, typical aircraft power system requirements related to inrush currents must be accomplished in the terminals of the load (or, within the load), generally using a pre-charge resistor (to limit inrush current) in parallel to an electro-mechanical relay or a solid-state switch (e.g. thyristor). This technique increases physical volume, weight and cost of the load(s), and hence to the overall system, and impacts reliability.

Aircraft require electrical power to operate many parts of the aircraft system, including on-board flight control systems, lighting, air conditioning etc. The current and future generations of aircraft use more and more electrical control in place of convention hydraulic, pneumatic etc. control. Such more electric aircraft (MEA) have advantages in terms of the size and weight of the controls and power systems as well as in terms of maintenance and reliability. More recently, Solid State Power Controllers (SSPCs) have been used in power distribution systems, particularly in aircraft technology where there is a move towards 'more electric aircraft' (MEA). SSPCs allow integration of more functionalities such as current limiting, bus diagnostics, fault detection, and others compared to conventional electromechanical relays. Also it is worth mentioning that SSPCs are more robust than electromechanical relays (i.e. arcing) and are faster to shut down. In private electrical buses the inrush current limiting does not have to be accomplished necessarily in the load. Therefore, there is the opportunity for SSPCs to control the inrush current instead of using additional components within the load.

Some prior solutions with SSPCs have been considered, including incorporating pre-charge circuitry in the SSPC. Solutions limiting the inrush current by active means, for example, uses active temperature control using a thermal model of the switch. This can be very effective and prevent overheating, but is very complex.

BRIEF DESCRIPTION

Embodiments of the present invention are directed to a system. A non-limiting example of the system includes a first set of batteries coupled to a battery terminal, a power converter coupled to a power converter terminal, wherein the battery terminal is coupled to the power converter terminal, a first current limiting circuit in series with the first set of batteries, wherein the current limiting circuit comprises a first circuit comprising a first transistor in series with a first diode, wherein a first anode of the first diode is coupled to a first drain of the first transistor, and wherein a first source of the first transistor is coupled to a first node, a second circuit comprising a second transistor in series with a second diode, wherein a second cathode of the second diode is coupled to a second source of the second transistor, and wherein a second drain of the second transistor is coupled to the first node, a first resistor inductor (RL) circuit, wherein the first RL circuit, the first circuit, and the second circuit are arranged in parallel, a controller configured to operate the first current limiter in a plurality of modes comprising a battery discharge mode, wherein the battery discharge mode comprises the controller operating the first transistor in an off state, and operating the second transistor in a switching state.

Embodiments of the present invention are directed to a method. A non-limiting example of the method includes providing a first set of batteries coupled to a battery terminal, providing a power converter coupled to a power converter terminal, wherein the battery terminal is coupled to the power converter terminal, providing a first current limiting circuit in series with the first set of batteries, wherein the current limiting circuit comprises a first circuit comprising a first transistor in series with a first diode, wherein a first anode of the first diode is coupled to a first drain of the first transistor, and wherein a first source of the first transistor is coupled to a first node, a second circuit comprising a second transistor in series with a second diode, wherein a second cathode of the second diode is coupled to a second source of the second transistor, and wherein a second drain of the second transistor is coupled to the first node, a first resistor inductor (RL) circuit, wherein the first RL circuit, the first circuit, and the second circuit are arranged in parallel, operating, by a controller, the first current limiter in a plurality of modes comprising a battery discharge mode, wherein the battery discharge mode comprises operating the first transistor in an off state, and operating the second transistor in a switching state.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
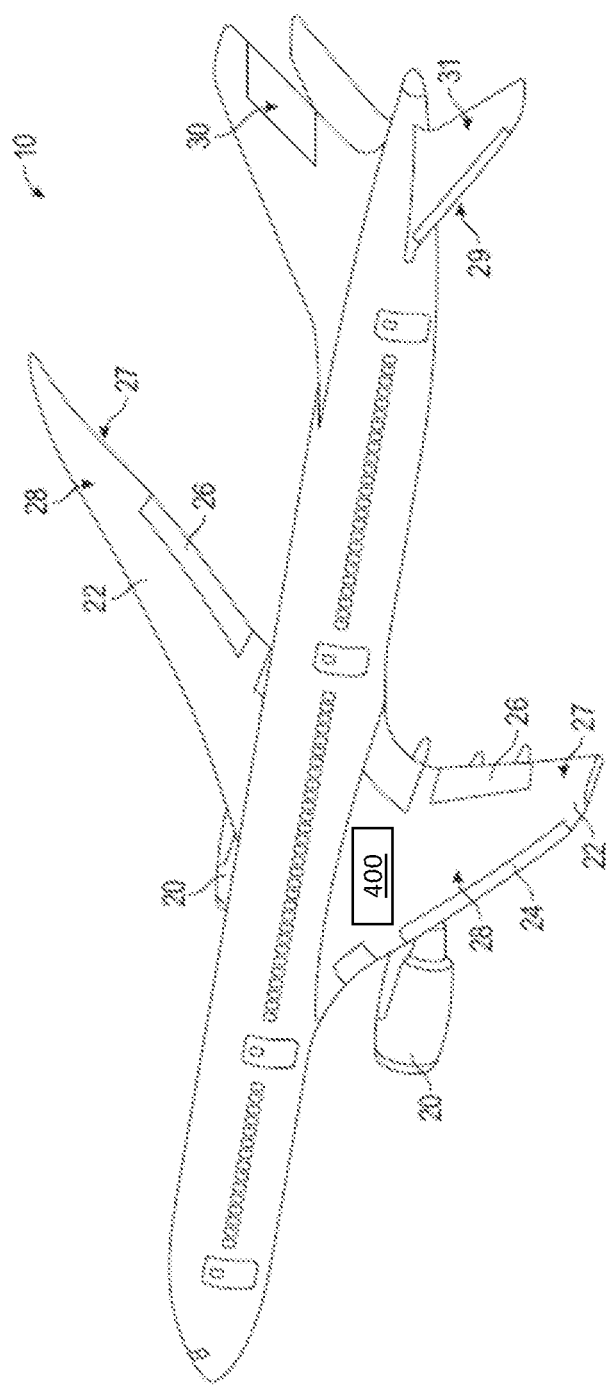
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a system 400 (described in greater detail in FIG. 4) which allows for multifunctional current limiting in energy storage systems according to one or more embodiments. The energy storage system can supply power to a DC bus that provides power for a variety of power applications on the aircraft.

Turning now to an overview of technologies that are more specifically relevant to aspects of the disclosure, when the aircraft is in the air the power comes from an electric power generating system (EPGS) which typically includes one or more generators and/or battery modules on the aircraft. The power generator and/or battery modules provide a DC power supply to power a DC bus on the aircraft. Although DC power systems provide advantages in terms of efficiency, reliability, and flexibility, the movement towards adopting DC technologies suffers from widespread concern over the means to protect DC distribution systems against short-circuit faults, ground faults, and open-circuit faults, especially at the medium voltage level. In fact, traditional fault protection schemes based on circuit breakers are not applicable for medium voltage direct current (MVDC) power distribution systems due to limitations including, but not limited to, (1) arcing problems due to the slow response and voltage swings; (2) low protection capability due to very slow disconnection response; (3) no DC voltage control; and (4) current rating has increased at the low voltage of a battery pack.

Typical faults in DC power networks include internal short circuits in modules of energy storage devices and external short circuits at terminals or casings. For large scale energy storage devices which include high power DC-link capacitors and battery energy storage systems (BESS), there are multiple modules connected in both series and parallel. Arcing current can be a common fault for these energy storage devices. This type of fault can cause critical system damage. Conventional protection schemes use fuses. However, fuses have very slow response time (i.e., >15 ms) and the current limiting effect is insignificant. Conventional fuse protections in DC power networks allow suffer from the following drawbacks: (1) low protection capability due to very slow response time; (2) no reclosing operation after fault recovery due to fuse needing to be replaces; (3) not enough surge current limitation at the battery and DC-link; (4) not enough arc current limitation at the battery and DC-link; (5) needs of additional pre-charging circuit; and (6) over voltage by regeneration.

In one or more embodiments, addressing the above limitations, aspects of the present disclosure provide for a multi-functional current limiter for energy storage devices. The current limiter utilizes solid state bi-directional switches and a damping RL circuit that has the following advantages: (1) limiting arc/surge current, (2) fast response for limiting current, (3) initial pre-charge between energy storage devices, and (4) mitigating voltage imbalance between battery modules. In order to improve the current limiter performance, the switches can be wide band gap devices (e.g. SiC MOSFET, GaN device and so on). This multi-functional current limiter can be incorporated with energy storage devices which can allow for the replacement of conventional fuse devices. The current limiter allows for the following features including, but not limited to, pre-charging function at initial installation, surge current limitation between series battery modules, equalizing voltage imbalance, damping circuit to minimize the peak arcing current, and reclosing operation after fault recovery.

Figure 2:
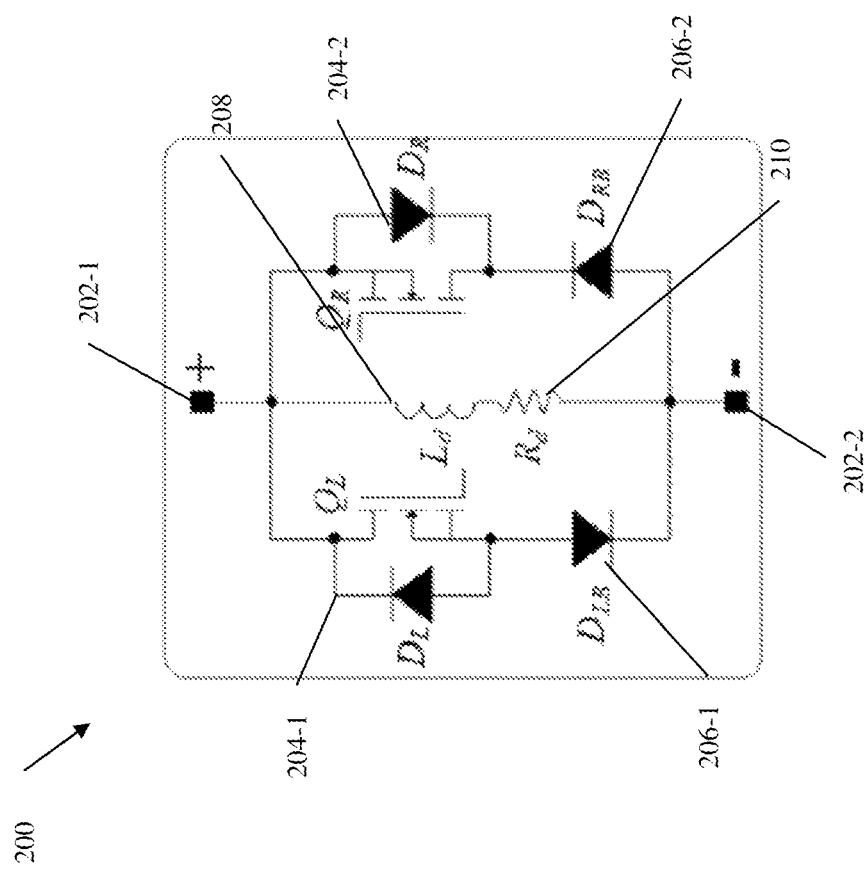
FIG. 2 depicts a circuit diagram of a topology of a multi-functional current limiter according to one or more embodiments.

FIG. 2 depicts a circuit diagram of a topology of a multi-functional current limiter according to one or more embodiments. The current limiter 200 includes input/output (I/O) terminals 202-1, 202-2 along with two switches 204-1, 204-2, two diodes 206-1, 206-2, and an resistance inductor (RL) circuit including an inductor 208 and resistor 210. There are two series circuits that include a diode 206-1, 206-2 arranged in series with a switch 204-1, 204-2, respectively. The RL circuit is in parallel with the two circuits (i.e., switch/diode). The diode/switch circuits are arranged as follows. The left side circuit has the source of the switch 204-1 coupled to the anode of the diode 206-1 and the drain of the switch 204-1 is coupled to the terminal 202-1 while the cathode of the diode 206-1 is coupled to terminal 202-2. The right side circuit has the drain of switch 204-2 coupled to the cathode of diode 206-2 and the source of switch 204-2 coupled to terminal 202-1 and the anode of diode 206-2 coupled to terminal 202-2. This configuration allows for unidirectional current flow. The two switches 204-1, 204-2 can be any type of switch including, but not limited, to wide band gap device (WBG).

Figures 3A, 3B:
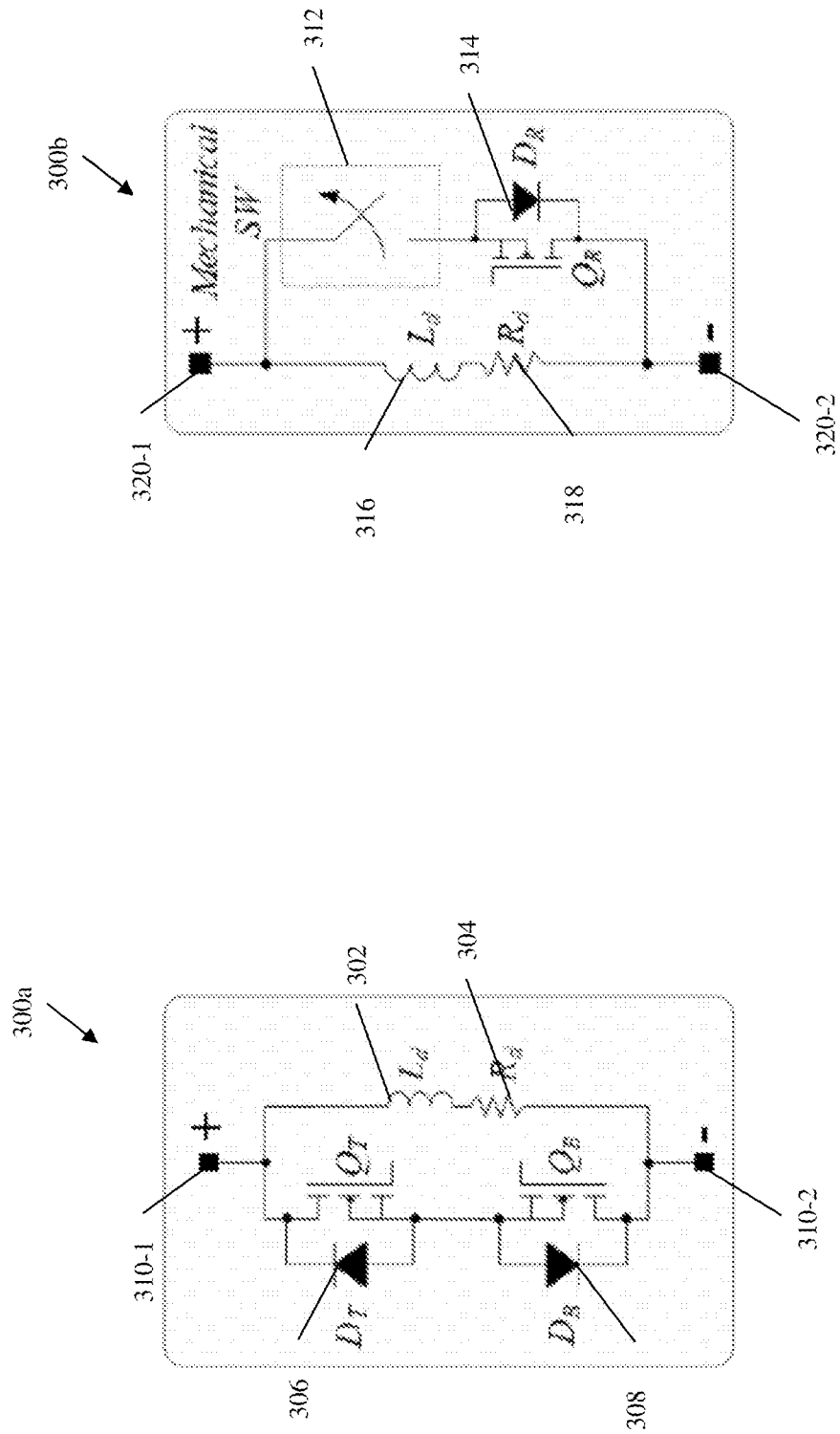
FIG. 3a depicts a circuit diagram of a topology for a multi-functional current limiter according to one or more embodiments.
FIG. 3b depicts a circuit diagram of a topology for a multi-functional current limiter according to one or more embodiments.

FIG. 3a depicts a circuit diagram of a topology for a multi-functional current limiter according to one or more embodiments. The current limiter 300a includes I/O terminals 310-1, 310-2 along with an RL circuit that includes an inductor 302 in series with a resistor 304. The RL circuit is in parallel with a bi-directional switch that includes a first switch 306 and second switch 308. The bi-directional switch can be implemented with two WBG devices) which are placed in a configuration where each transistor 306, 308 shares a common source. The drain of one of the first transistors 306 is a first I/O terminal of the bi-directional switch and the drain of the second transistors is a second I/O terminal of the bi-directional switch, for example.

FIG. 3b depicts a circuit diagram of a topology for a multi-functional current limiter according to one or more embodiments. The current limiter 300b includes I/O terminals 320-1, 320-2 along with an RL circuit that includes an inductor 312 in series with a resistor 304. The RL circuit is in parallel with two series switches 312, 314. The first switch 312 can be a mechanical switch and the second switch 314 and be an WBG device. In this current limiter 300b, conduction losses can be minimized by using this mechanical switch 312.

Figure 4:
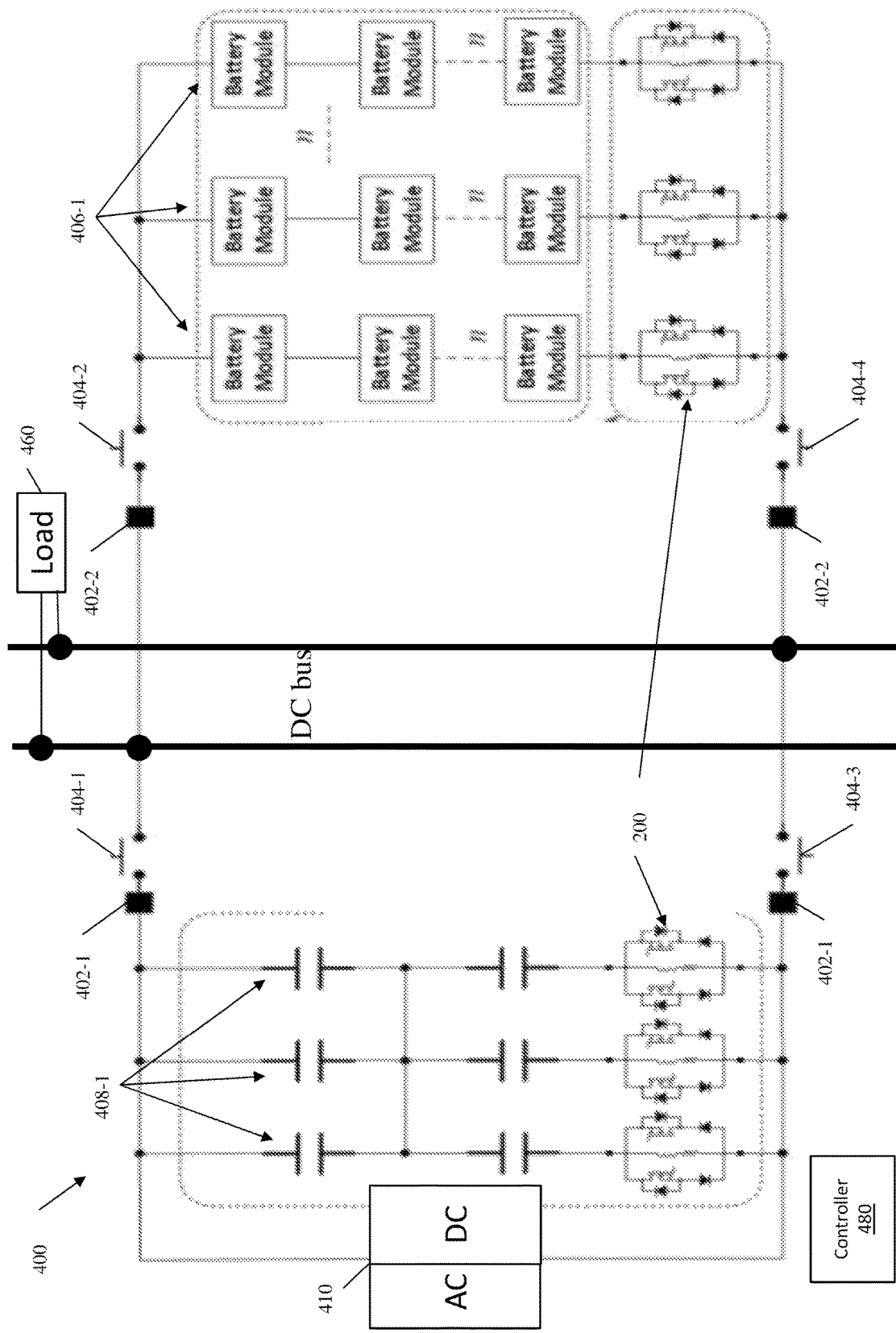
FIG. 4 depicts a circuit diagram of a topology for an energy storage system utilizing a multi-functional current limiter according to one or more embodiments.

FIG. 4 depicts a circuit diagram of a topology for aircraft dc power network with an energy storage system utilizing a multi-functional current limiter according to one or more embodiments. The system 400 includes multiple sets of battery modules 406-1 where each set of batteries is in series with a current limiter 200 (from FIG. 2). The sets of battery modules 406-1 can include any number of battery cells. The system 400 includes a power converter 410 and multiple sets of DC-link capacitors 408-1 where each set of DC-link capacitors is in series with a current limiter 200 (from FIG. 2). The power converter 410 is coupled to the DC-linked capacitors 408-1 and a power converter terminal (+/-) 402-1. In the aircraft dc power network 400 the power converter terminal 402-1 is coupled to a battery terminal 402 coupled to the sets of batteries 406-1. The power converter 410 can be an AC/DC power converter that drives an AC load on an aircraft. The sets of battery modules 406-1 can provide DC power to the power converter 410 which in turn converts the DC power to AC for the AC load. The DC link capacitors are used as a load-balancing energy storage device. The capacitor is placed parallel to the battery, which maintains a solid voltage across the inverter (DC/AC converter). This helps protect the inverter network from momentary voltage spikes, surges, and EMI. The system 400 also includes DC bus that a DC load 460 or other energy sources can be connected to DC bus. The system 400 also includes four circuit breakers or DC contactors 404-1, 404-2, 404-3, 404-4 arranged between the sets of battery modules 406-1 and the DC link capacitors 408-1.

As shown in FIG. 2, the current limiter includes two switches 204-1, 204-2 in series with diodes 206-1, 206-2, respectively. In one or more embodiments, the system 400 includes a controller 480 that is configured to operate the switches 404-1, 404-2 in the current limiters 200. The controllers 480 or any of the hardware referenced in the system 400 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

In one or more embodiments, the controller 480 is configured to operate the current limiter 200 and accompanying switches 206-1, 206-2 in multiple modes based on the requirements of the system. The multiple modes of operation include, but are not limited to, a pre-charging mode, an equalizing voltage imbalance mode, a battery discharge mode, a battery charging mode, and four types of protection modes. The four types of protection mode include a protection mode limiting current for a DC-link short circuit, a protection mode limiting current for a power converter terminal short circuit, a protection mode limiting current for a battery module short circuit, and a protection mode providing arc suppression during a battery module terminal short circuit. The various modes of operation are described in greater detail in FIGS. 5-12.

Figure 5:
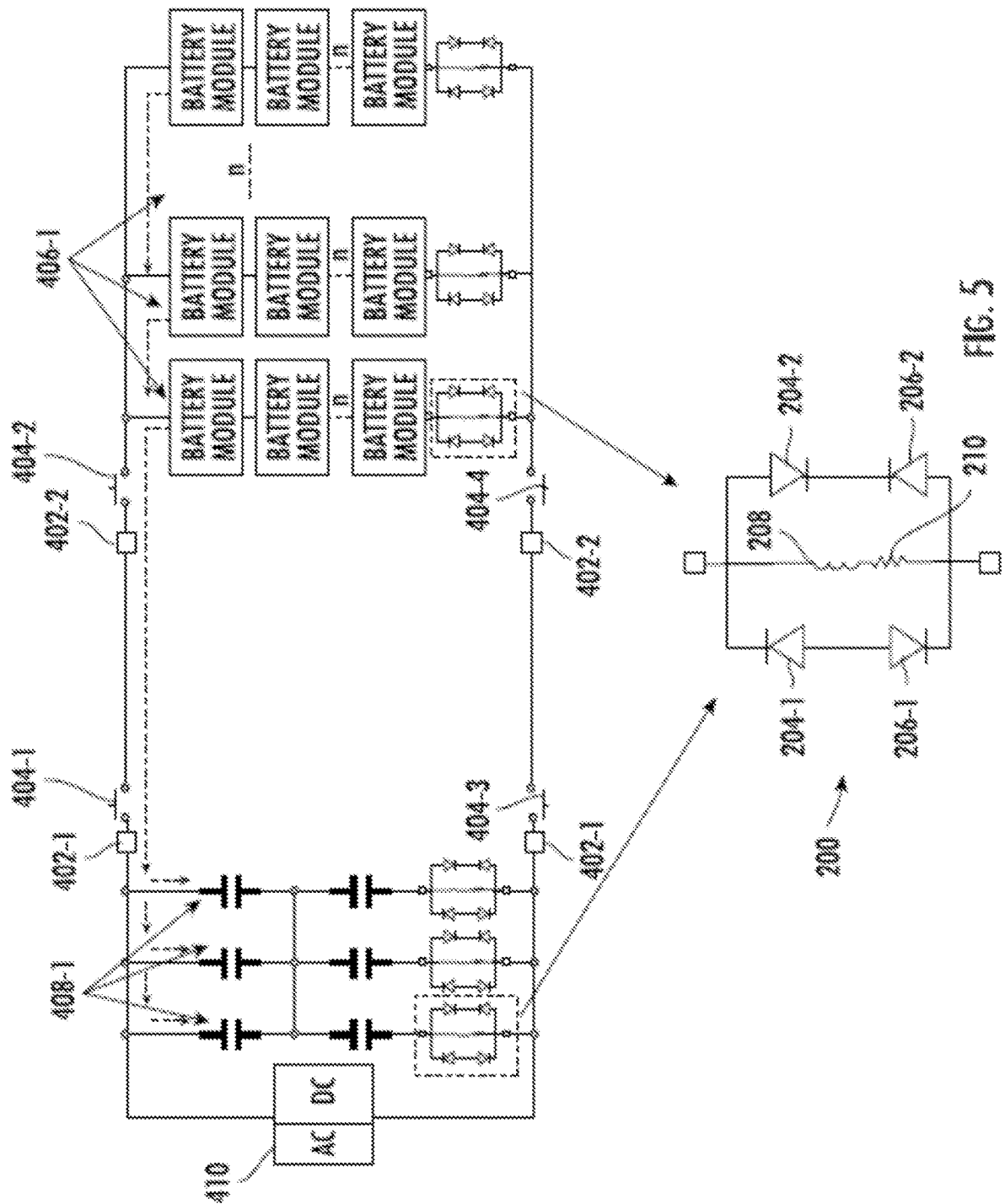
FIG. 5 depicts the operation of the current limiter 200 during a pre-charge mode of the energy storage system according to one or more embodiments.

FIG. 5 depicts the operation of the current limiter 200 during a pre-charge mode of the energy storage system according to one or more embodiments. During the pre-charge mode, the switches 204-1, 204-2 are in an off state. Current flows through the RL circuit 210 which has a high resistance, thus the current is limited. For example, the high resistance value can be 10 kΩ Pre-charge refers to a preliminary mode that limits the inrush current during a powering up of a circuit. In this pre-charge mode the current limiters in series with both the sets of battery modules 406-1 and DC-link capacitors 408-1 are operating in the same manner with each transistor in the off state.

Figure 6:
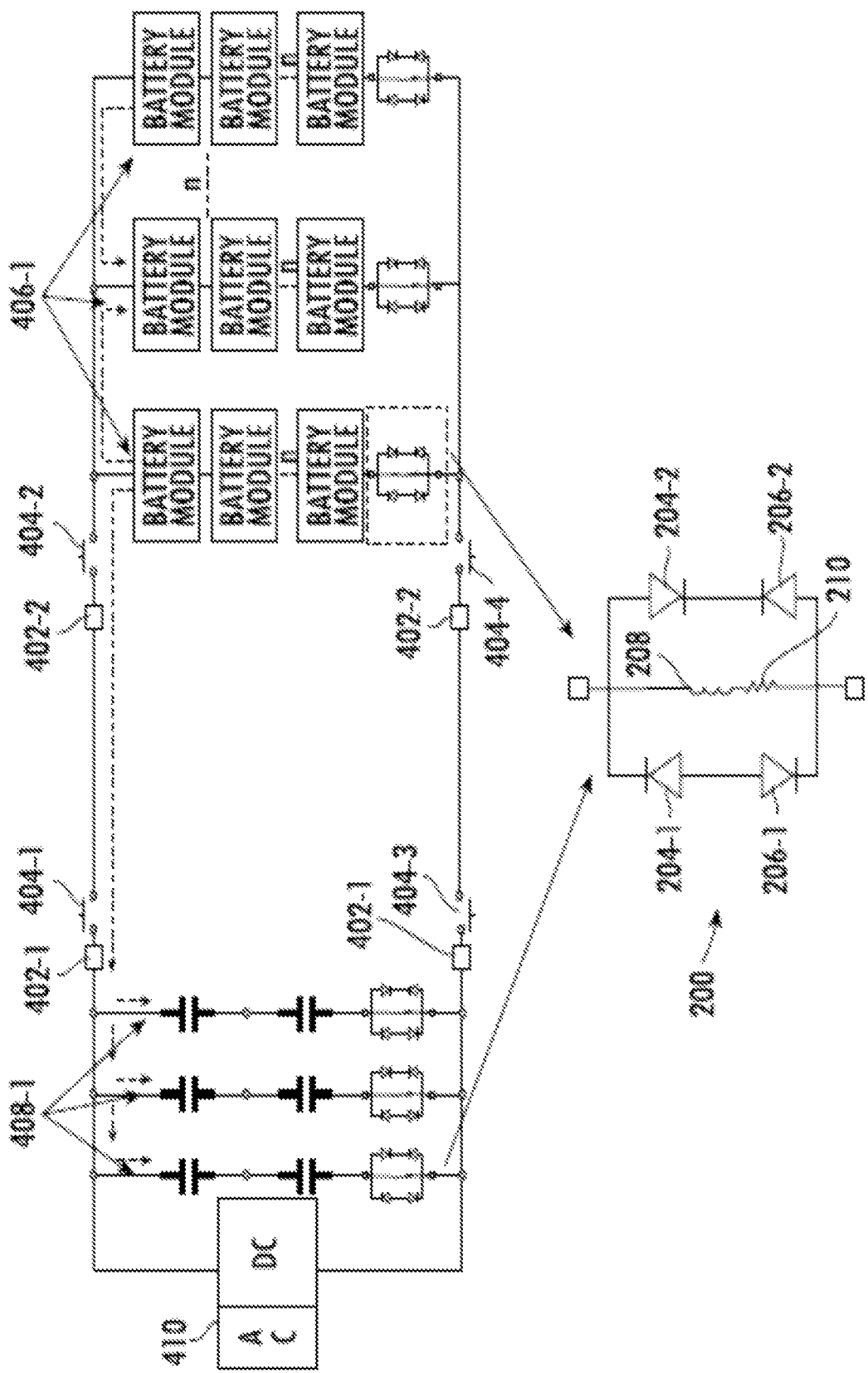
FIG. 6 depicts the operation of the current limiter in the equalizing voltage imbalance mode according to one or more embodiments.

FIG. 6 depicts the operation of the current limiter in the equalizing voltage imbalance mode according to one or more embodiments. During the equalizing voltage imbalance mode, the switches 204-1, 204-2 are in an off state allowing current to flow through the RL circuit. If there is an imbalance between the batteries, the RL circuit can limit the current. After that, the current will be flowing from a high voltage battery to a low voltage battery naturally.

Figure 7:
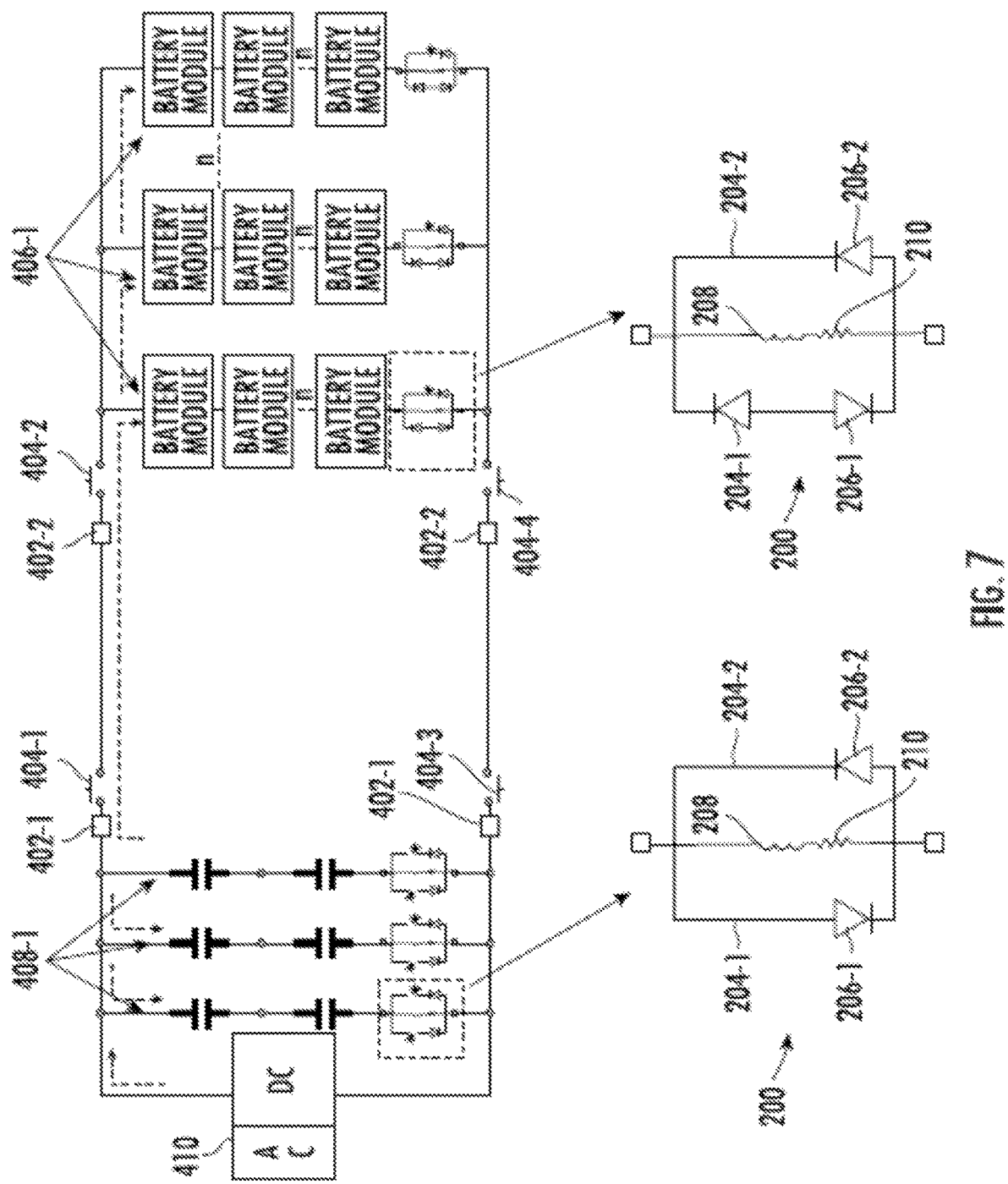
FIG. 7 depicts the operation of the current limiter in the battery discharge mode according to one or more embodiments.

FIG. 7 depicts the operation of the current limiter in the battery discharge mode according to one or more embodiments. During the battery discharge mode, an AC load is connected to the power converter 410 and the battery modules 406-1 are driving this AC load with the AC power supplied by the power converter 410. In the battery discharge mode, the current limiters in series with the DC-link capacitors 408-1 operate as bidirectional current flows with all switches 204-1, 204-2 in an "on" state. As mentioned before, the switches 204-1, 204-2 can be a wide bandgap device. The current limiters in series with the battery modules 406-1 operates to facilitate uni-directional current flow. Thus, the battery has only discharging current flow. In this operation, the current flows through the wide band gap device 204-2 because the impedance of RL circuit is higher than the turning on state of the wide band gap device 204-2.

Figure 8:
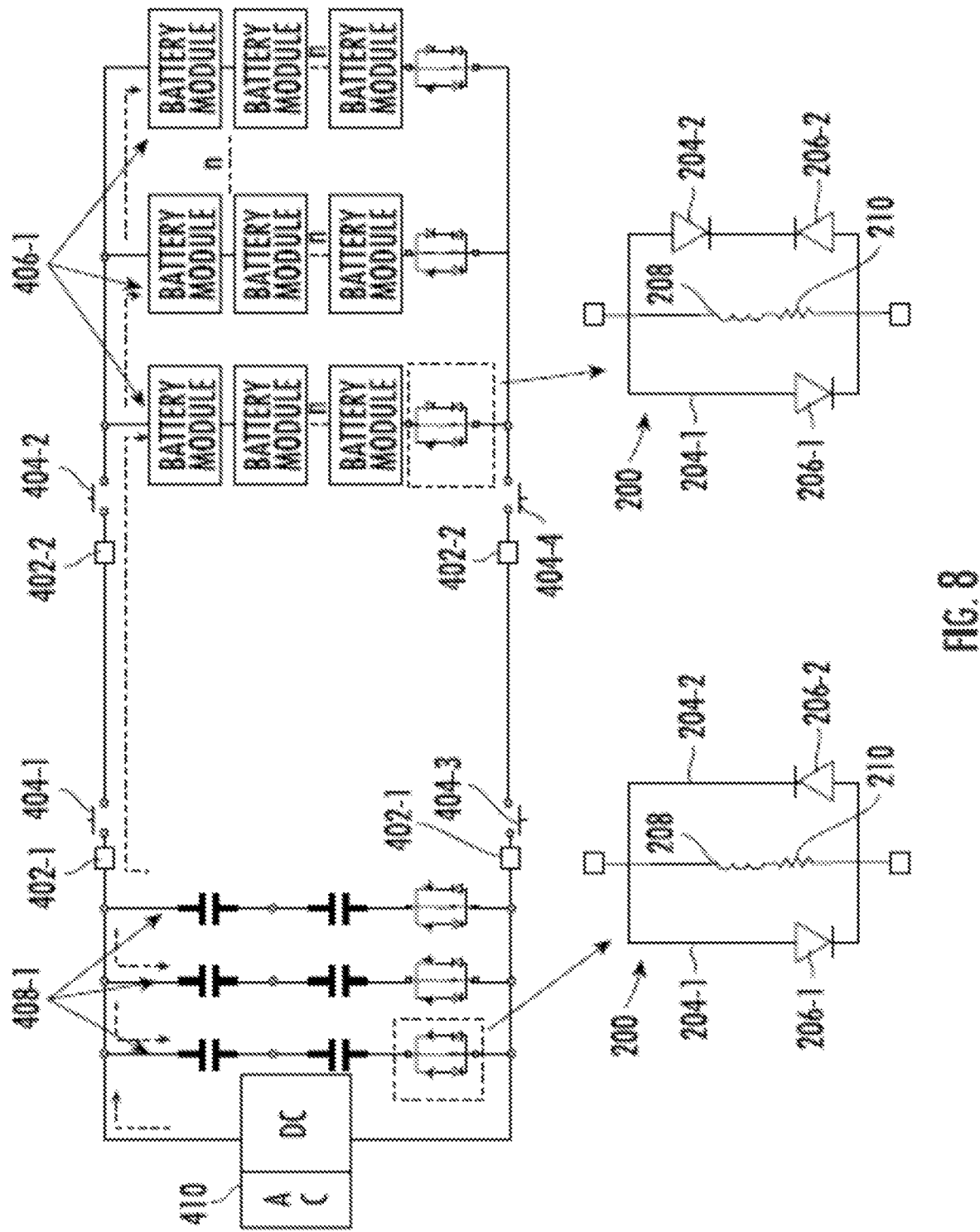
FIG. 8 depicts the operation of the current limiter in a battery charging mode according to one or more embodiments.

FIG. 8 depicts the operation of the current limiter in a battery charging mode according to one or more embodiments. During the battery charge mode, an AC source is connected to the power converter 410 to provide AC power to the power converter 410 which is then rectified to DC power. The DC power charges the battery modules 406-1. In the battery charging mode, the current limiters in series with the DC-link capacitors 408-1 operate as the bidirectional current flow with all "on" state of the wide bandgap devices 204-1, 204-2. The right side current limiter is being operated with bidirectional current flow. In this operation, the current flows through the wide band gap device 204-1 because the impedance of the RL circuit 208, 210 is higher than the turning on state of the wide band gap device 204-1. The wide bandgap device 204-2 offers very low resistance; however, 206-2 blocks the current flow.

Figure 9:
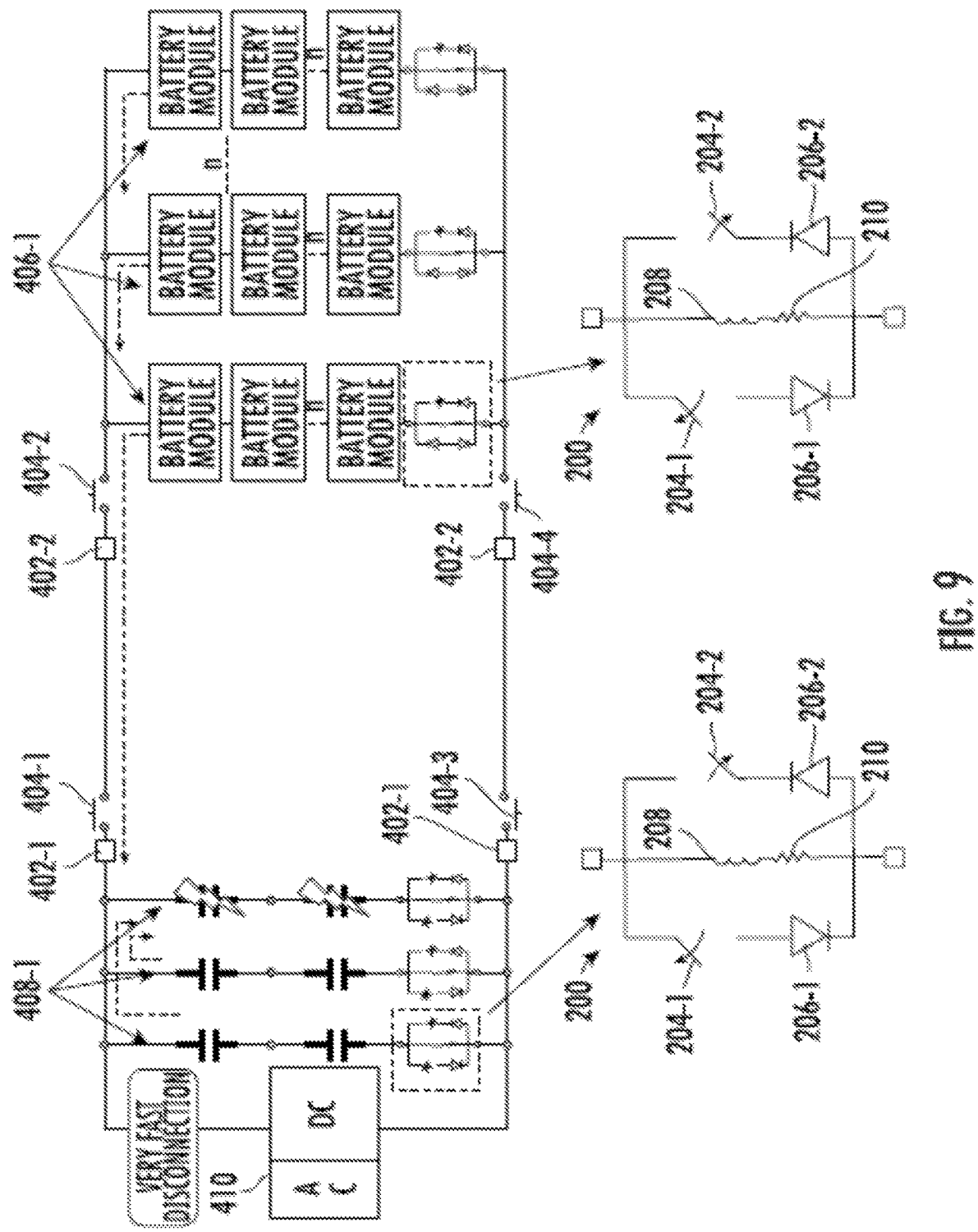
FIG. 9 depicts the operation of the current limiter in the protection mode limiting current for a DC-link short circuit according to one or more embodiments.

FIG. 9 depicts the operation of the current limiter in the protection mode limiting current for a DC-link short circuit according to one or more embodiments. In one or more embodiments, the DC-link short circuit can be detected using a sensing element in communication with the controller 280 to determine a short circuit exists. Based on the detection of the short circuit in the DC-link capacitor, the current limiters are operated as follows. The left side current limiter switches 204-1, 204-2 turned off in a switching state. The right side current limiters (in series with the battery modules) are operated where switch 204-1, 204-2 turned off in a switching state. In this operation, the current flow can be transferred from switches to RL circuit. The current can be limited and the energy storage can be protected from the short circuit.

Figure 10:
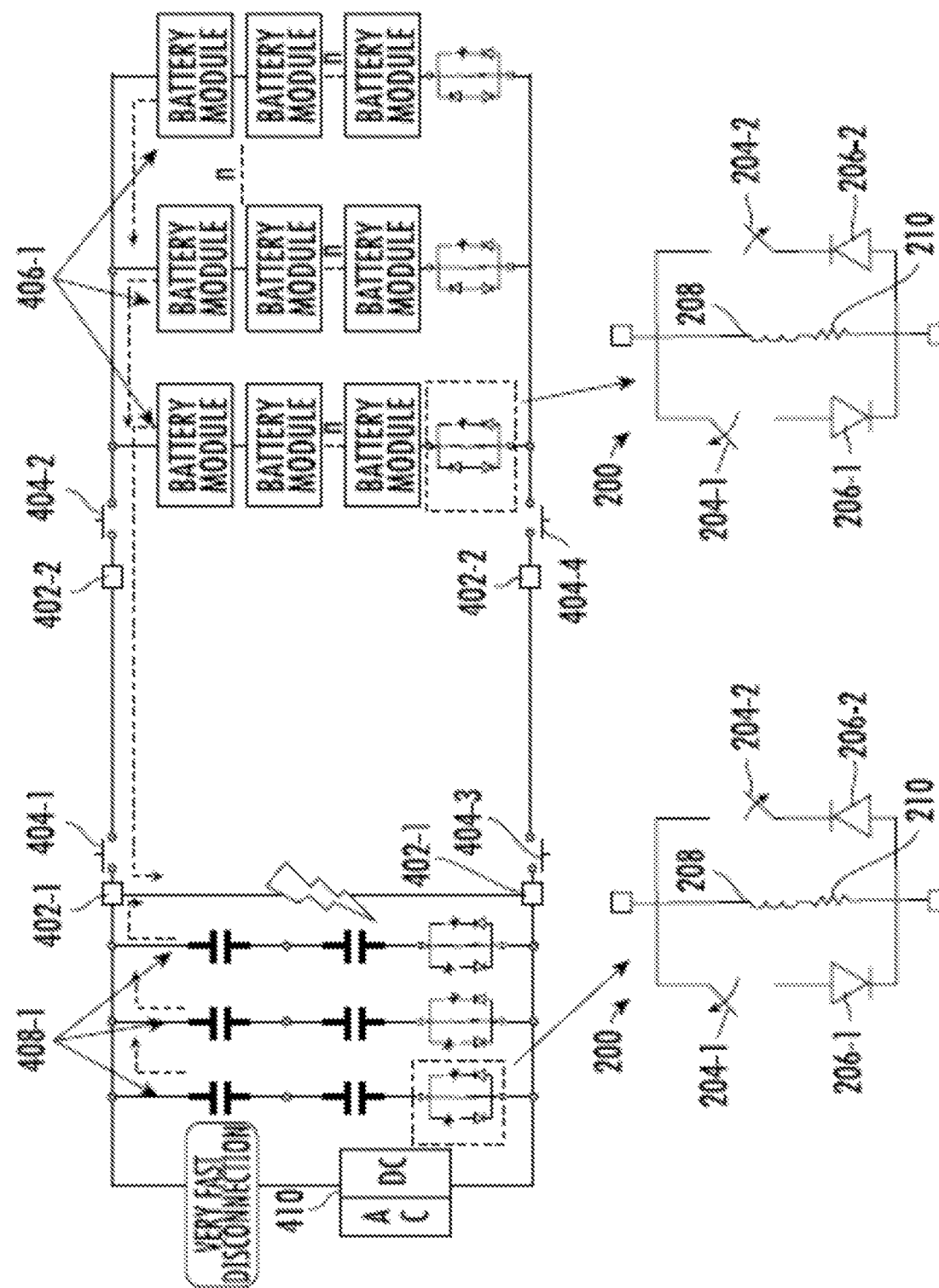
FIG. 10 depicts the operation of the current limiter in the protection mode limiting current for a power converter terminal short circuit according to one or more embodiments.

FIG. 10 depicts the operation of the current limiter in the protection mode limiting current for a power converter terminal short circuit according to one or more embodiments. The power converter terminal 402-1 short circuit can be detected using a sensing element in communication with the controller 280 to determine the short circuit exists. Based on this detection, the current limiters are operated as follows. The left side current limiter switches 204-1, 204-2 turned off in a switching state. The right side current limiters (in series with the battery modules) are operated where switch 204-1, 204-2 are turned off in a switching state. In this operation, the current flow can be transferred from switches to the RL circuit 208, 210. The current can be limited and the energy storage can be protected from the short circuit.

Figure 11:
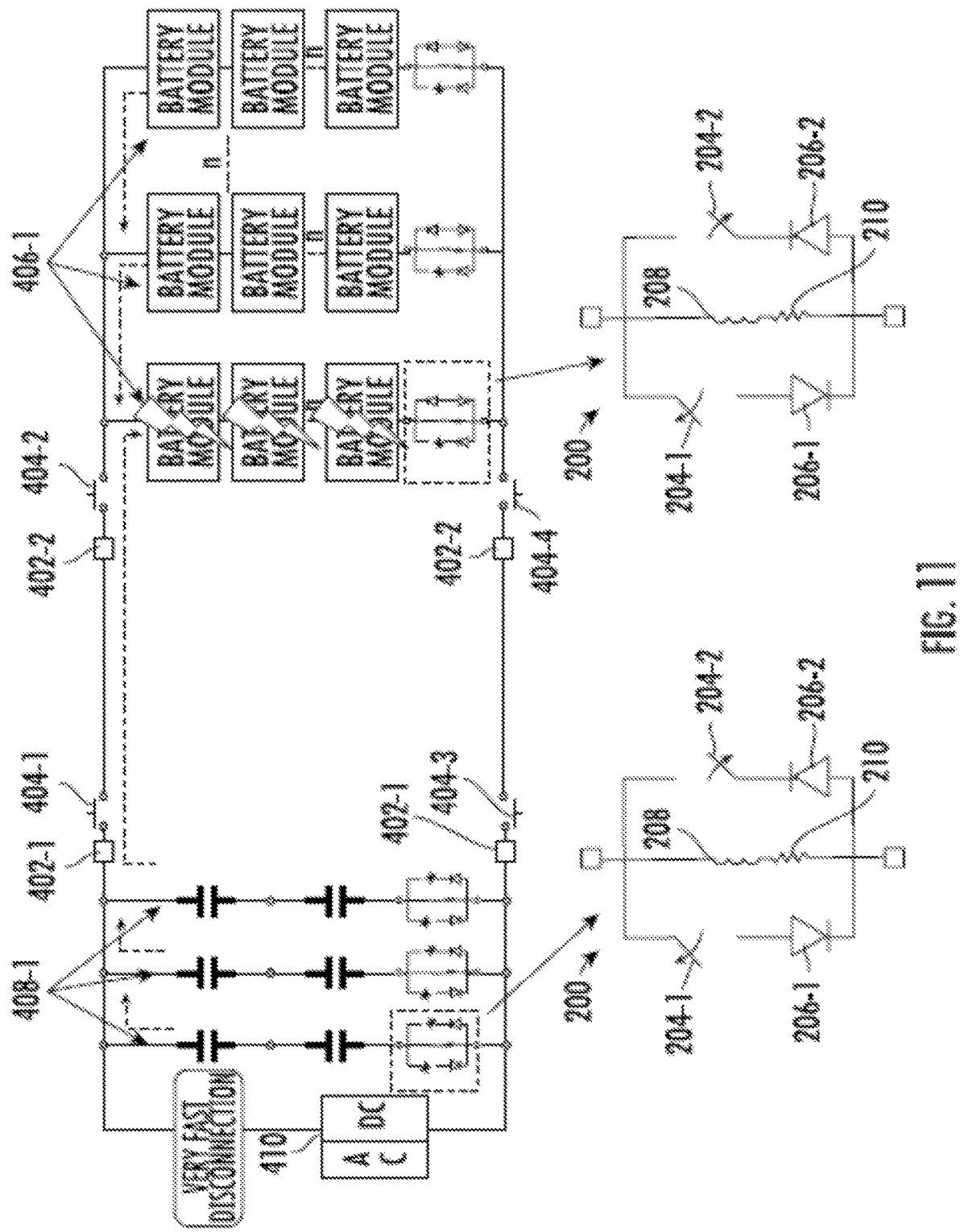
FIG. 11 depicts the operation of the current limiter in protection mode limiting current for a battery module short circuit according to one or more embodiments.

FIG. 11 depicts the operation of the current limiter in protection mode limiting current for a battery module short circuit according to one or more embodiments. The battery module short circuit can be detected using a sensing element in communication with the controller 280 to determine the short circuit exists. Based on this detection, the current limiters are operated as follows. The left side current limiter switches 204-1, 204-2 turned off in a switching state. The right side current limiters (in series with the battery modules) are operated where switch 204-1, 204-2 turned off in a switching state. In this operation, the current flow can be transferred from switches to RL circuit. The current can be limited and the energy storage can be protected from the short circuit.

Figure 12:
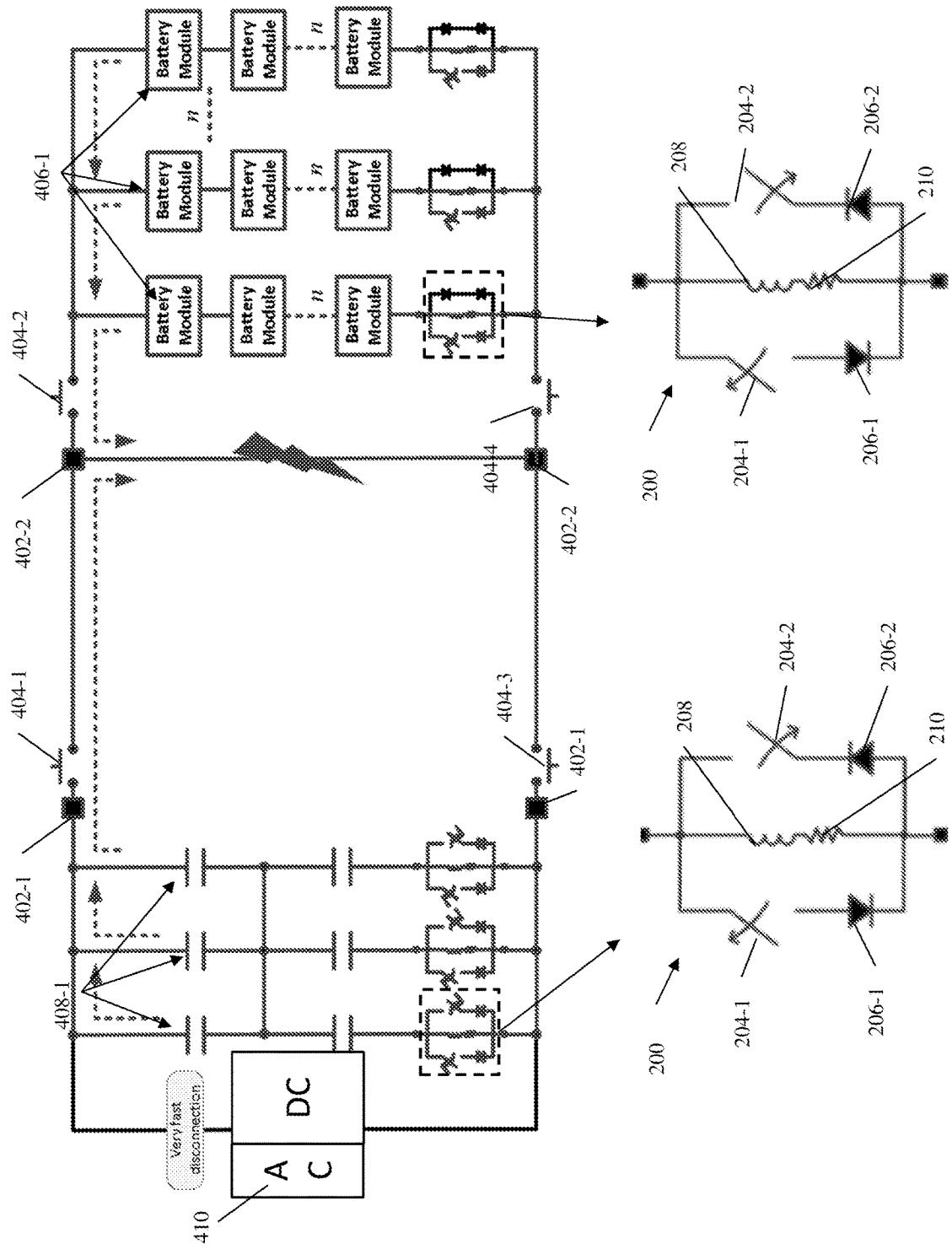
FIG. 12 depicts the operation of the current limiter in protection mode limiting current providing arc suppression during a battery module terminal short circuit according to one or more embodiments.

FIG. 12 depicts the operation of the current limiter in protection mode limiting current providing arc suppression during a battery module terminal short circuit according to one or more embodiments. The battery module terminal short circuit can be detected using a sensing element in communication with the controller 280 to determine the short circuit exists. Based on this detection, the current limiters are operated as follows. The left side current limiter switches 204-1, 204-2 turned off in a switching state. The right side current limiters (in series with the battery modules) are operated where switch 204-1, 204-2 are turned off in a switching state. In this operation, the current flow can be transferred from switches to RL circuit. The current can be limited and the energy storage can be protected from the short circuit.

In one or more embodiments, the current limiter 200 described in FIG. 4 can be substituted with current limiters 300a or 300b. In one or more embodiments, the controller 480 (from FIG. 2) can operate each of the switches from the current limiter 200 according to the modes described in FIGS. 5-12.

Figure 13:
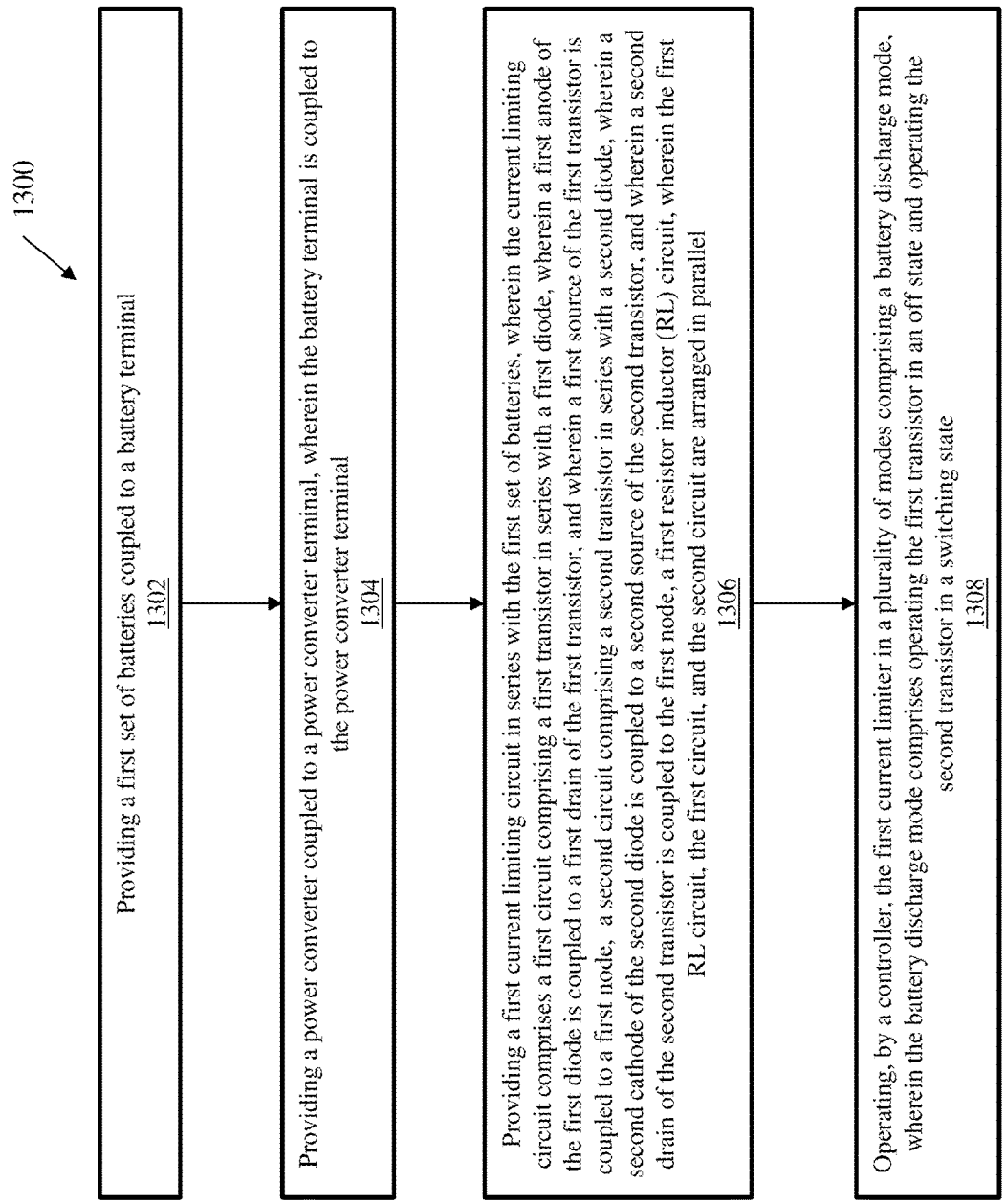
FIG. 13 depicts a flow diagram of a method for operating a current limiter according to one or more embodiments.

FIG. 13 depicts a flow diagram of a method for operating a current limiter according to one or more embodiments. The method 1300 includes providing a first set of batteries coupled to a battery terminal, as shown in block 1302. At block 1304, the method 1300 includes providing a power converter coupled to a power converter terminal, wherein the battery terminal is coupled to the power converter terminal. Also, at block 1306, the method 1300 includes providing a first current limiting circuit in series with the first set of batteries, wherein the current limiting circuit comprises a first circuit comprising a first transistor in series with a first diode, wherein a first anode of the first diode is coupled to a first drain of the first transistor, and wherein a first source of the first transistor is coupled to a first node, a second circuit comprising a second transistor in series with a second diode, wherein a second cathode of the second diode is coupled to a second source of the second transistor, and wherein a second drain of the second transistor is coupled to the first node, a first resistor inductor (RL) circuit, wherein the first RL circuit, the first circuit, and the second circuit are arranged in parallel. And at block 1308, the method 1300 includes operating, by a controller, the first current limiter in a plurality of modes comprising a battery discharge mode, wherein the battery discharge mode comprises operating the first transistor in an off state and operating the second transistor in a switching state.

Additional processes may also be included. It should be understood that the processes depicted in FIG. 13 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a first set of batteries coupled to a battery terminal;
   a power converter coupled to a power converter terminal, wherein the battery terminal is coupled to the power converter terminal;
   a first current limiting circuit in series with the first set of batteries, wherein the current limiting circuit comprises:
   a first circuit comprising a first transistor in series with a first diode, wherein a first anode of the first diode is coupled to a first source of the first transistor, and wherein a first drain of the first transistor is coupled to a first node;
   a second circuit comprising a second transistor in series with a second diode, wherein a first cathode of the second diode is coupled to a second drain of the second transistor, and wherein a second source of the second transistor is coupled to the first node;
   a first resistor inductor (RL) circuit comprising a first resistor and a first inductor connected in series, wherein the first RL circuit, the first circuit, and the second circuit are arranged in parallel; and
   a controller configured to:
   operate the first current limiting circuit in a plurality of modes comprising:
   a battery discharge mode, wherein when in the battery discharge mode the controller causes the first transistor to not conduct current and the second transistor to conduct current; and
   a voltage imbalance mode, wherein when in the voltage imbalance mode the controller causes the first transistor and the second transistor to not conduct current, and current flows between at least a first battery and a second battery of the first set of batteries.

2. The system of claim 1, further comprising:
   a first set of DC-link capacitors coupled between the power converter and the power converter terminal; and
   a second current limiting circuit in series with the first set of capacitors.

3. The system of claim 2, wherein the second current limiting circuit comprises:
   a first bi-directional switch comprising a third transistor and a fourth transistor, wherein a source of the third transistor is coupled to a source of the fourth transistor; and
   a second RL circuit in parallel with the first bi-directional switch, the second RL circuit comprising a second resistor and a second inductor connected in series.

4. The system of claim 2, wherein the second current limiting circuit comprises:
   a third circuit comprising a first mechanical switch in series with a third transistor; and
   a second RL circuit arranged in parallel with the third circuit.

5. The system of claim 2, wherein the second current limiting circuit comprises:
   a third circuit comprising a third transistor in series with a third diode, wherein a second anode of the third diode is coupled to a third source of the third transistor, and wherein a third drain of the third transistor is coupled to a second node;
   a fourth circuit comprising a fourth transistor in series with a fourth diode, wherein a second cathode of the fourth diode is coupled to a fourth drain of the fourth transistor, and wherein a fourth source of the fourth transistor is coupled to the second node; and
   a second RL circuit, wherein the second RL circuit, the third circuit, and the fourth circuit are arranged in parallel.

6. The system of claim 5, wherein in the battery discharge mode the controller causes the third transistor and the fourth transistor to conduct current.

7. The system of claim 5, wherein the plurality of modes further comprises a battery charging mode; and
wherein in the battery charging mode, the controller causes the first, third, and fourth transistors to conduct current and the second transistor to not conduct current.

8. The system of claim 5, wherein the plurality of modes further comprises a first protection mode;
wherein the first protection mode comprises the controller:
detecting a short circuit at a first location associated with the power converter and causing the first, second, third, and fourth transistors to not conduct current.

9. The system of claim 8, wherein the first location comprises a first capacitor in the first set of DC-link capacitors.

10. The system of claim 8, wherein the first location comprises the power converter terminal.

11. The system of claim 5, wherein the plurality of modes further comprises a second protection mode;
wherein the second protection mode comprises the controller:
detecting a short circuit at a first location associated with the first set of batteries and causing the first, second, third, and fourth transistors to not conduct current.

12. The system of claim 11, wherein the first location comprises a battery in the first set of batteries.

13. The system of claim 11, wherein the first location comprises the battery terminal.

14. The system of claim 2, further comprising:
a second set of DC-link capacitors arranged in parallel with the first set of DC-link capacitors;
a third current limiting circuit in series with the first set of capacitors.

15. The system of claim 1, further comprising a circuit breaker coupled between the power converter and the first set of batteries.

16. The system of claim 1, further comprising:
a second set of batteries in parallel with the first set of batteries; and
a second current limiting circuit in series with the second set of batteries.

17. A method comprising:
providing a first set of batteries coupled to a battery terminal;
providing a power converter coupled to a power converter terminal, wherein the battery terminal is coupled to the power converter terminal;
providing a first current limiting circuit in series with the first set of batteries, wherein the current limiting circuit comprises:
a first circuit comprising a first transistor in series with a first diode, wherein a first anode of the first diode is coupled to a first source of the first transistor, and wherein a first drain of the first transistor is coupled to a first node;
a second circuit comprising a second transistor in series with a second diode, wherein a first cathode of the second diode is coupled to a second drain of the second transistor, and wherein a second source of the second transistor is coupled to the first node; and
a first resistor inductor (RL) circuit comprising a first resistor and a first inductor connected in series, wherein the first RL circuit, the first circuit, and the second circuit are arranged in parallel; and operating, by a controller, the first current limiting circuit in a plurality of modes comprising:
a battery discharge mode, wherein in the battery discharge mode the controller causes the first transistor to not conduct current and the second transistor to conduct current; and
a voltage imbalance mode, wherein when in the voltage imbalance mode the controller causes the first transistor and the second transistor to not conduct current, and current flows between at least a first battery and a second battery of the first set of batteries.

18. The method of claim 17, further comprising:
providing a first set of DC-link capacitors coupled between the power converter and the power converter terminal;
providing a second current limiting circuit in series with the first set of DC-link capacitors, wherein the second current limiting circuit comprises:
a third circuit comprising a third transistor in series with a third diode, wherein an anode of the third diode is coupled to a third source of the third transistor, and wherein a third drain of the third transistor is coupled to a second node;
a fourth circuit comprising a fourth transistor in series with a fourth diode, wherein a second cathode of the fourth diode is coupled to a fourth drain of the fourth transistor, and wherein a fourth source of the fourth transistor is coupled to the second node; and
a second RL circuit comprising a second resistor and a second inductor connected in series, wherein the second RL circuit, the third circuit, and the fourth circuit are arranged in parallel.

19. The method of claim 18, wherein the plurality of modes further comprises a first protection mode;
wherein the first protection mode comprises:
detecting, by the controller, a short circuit at a first location associated with the power converter; and
causing, by the controller, the first, second, third, and fourth transistors to not conduct current.

20. The method of claim 18, wherein the plurality of modes further comprises a second protection mode;
wherein the second protection mode comprises:
detecting, by the controller, a short circuit at a first location associated with the first set of batteries; and
causing, by the controller, the first, second, third, and fourth transistors to not conduct current.

21. A system comprising:
a first set of batteries coupled to a battery terminal;
a power converter coupled to a power converter terminal, wherein the battery terminal is coupled to the power converter terminal;
a first current limiting circuit in series with the first set of batteries, wherein the current limiting circuit comprises:
a first circuit comprising a first transistor in series with a first diode, wherein a first anode of the first diode is coupled to a first source of the first transistor, and wherein a first drain of the first transistor is coupled to a first node;
a second circuit comprising a second transistor in series with a second diode, wherein a first cathode of the second diode is coupled to a second drain of the second transistor, and wherein a second source of the second transistor is coupled to the first node;
a first resistor inductor (RL) circuit comprising a first resistor and a first inductor connected in series, wherein the first RL circuit, the first circuit, and the second circuit are arranged in parallel;

a first set of DC-link capacitors coupled between the power converter and the power converter terminal;

a second current limiting circuit in series with the first set of capacitors, wherein the second current limiting circuit comprises:

a third circuit comprising a third transistor in series with a third diode, wherein a second anode of the third diode is coupled to a third source of the third transistor, and wherein a third drain of the third transistor is coupled to a second node;

a fourth circuit comprising a fourth transistor in series with a fourth diode, wherein a second cathode of the fourth diode is coupled to a fourth drain of the fourth transistor, and wherein a fourth source of the fourth transistor is coupled to the second node; and a second RL circuit, wherein the second RL circuit, the third circuit, and the fourth circuit are arranged in parallel; and a controller configured to operate the first current limiting circuit in a plurality of modes comprising:

a battery discharge mode, wherein when in the battery discharge mode the controller causes the first transistor to not conduct current and the second transistor to conduct current; and at least one of a first protection mode and a second protection mode, wherein:

the first protection mode comprises the controller detecting a short circuit associated with the power converter and causing the first, second, third, and fourth transistors to not conduct current; and the second protection mode comprises the controller detecting a second short circuit associated with the first set of batteries and causing the first, second, third, and fourth transistors to not conduct current; and a battery precharge mode, wherein when in the battery precharge mode the controller causes the third transistor and the fourth transistor to not conduct current, 10 and current flows through the second RL circuit;

a voltage imbalance mode, wherein when in the voltage imbalance mode the controller causes the first transistor and the second transistor to not conduct current, and current flows between at least a first battery and a second battery of the first set of batteries.

\* \* \* \* \*